(12) United States Patent
Kanoh

(10) Patent No.: US 6,341,313 B1
(45) Date of Patent: Jan. 22, 2002

(54) FLOW CONTROLLING METHOD AND APPARATUS FOR NETWORK BETWEEN PROCESSORS

(75) Inventor: Yasushi Kanoh, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/241,075

(22) Filed: Feb. 1, 1999

(30) Foreign Application Priority Data

Feb. 2, 1998 (JP) .......................................... 10-020558

(51) Int. Cl.[7] .......................... G06F 15/16; H04L 12/28
(52) U.S. Cl. ...................... 709/227; 709/228; 709/239; 370/235; 370/355; 370/278; 370/360
(58) Field of Search ................................ 709/233, 237, 709/227, 228, 239; 370/235, 278, 355, 360

(56) References Cited

U.S. PATENT DOCUMENTS

| | | | | |
|---|---|---|---|---|
| 5,233,603 A | * | 8/1993 | Takeuchi et al. | 370/412 |
| 5,493,566 A | * | 2/1996 | Ljungberg et al. | 370/60 |
| 5,898,677 A | * | 4/1999 | Deeley et al. | 370/276 |
| 6,021,115 A | * | 2/2000 | Simpson et al. | 370/235 |
| 6,067,300 A | * | 5/2000 | Baumert et al. | 370/413 |
| 6,101,551 A | * | 8/2000 | Kanoh | 709/245 |
| 6,128,297 A | * | 10/2000 | Reumerman et al. | 370/391 |
| 6,229,789 B1 | * | 5/2001 | Simpson et al. | 370/235 |

FOREIGN PATENT DOCUMENTS

| | | |
|---|---|---|
| DE | 37 50 657 T2 | 12/1987 |
| EP | 0 274 709 b1 | 7/1988 |
| JP | 60-160461 | 8/1985 |
| JP | 60-238963 | 11/1985 |
| JP | 5-189391 | 7/1993 |
| JP | 7-264242 | 10/1995 |
| JP | 8-87479 | 4/1996 |
| JP | 8-147250 | 6/1996 |

* cited by examiner

Primary Examiner—Krisna Lim
(74) Attorney, Agent, or Firm—Sughrue Mion, PLLC

(57) ABSTRACT

A packet switch provides a write signal when processing of a packet in a FIFO memory is started, and outputs the write signal to the preceding stage. Meanwhile, the writing side manages whether a FIFO memory in the next stage is in a write-enabled state, and renders it into a write-disabled state in response to writing of a packet. The writing side also renders the FIFO memory of the next stage into a write-enabled state in response to a write-enable signal from the next stage.

6 Claims, 7 Drawing Sheets

FLOW CONTROLLING METHOD AND APPARATUS FOR NETWORK BETWEEN PROCESSORS

BACKGROUND OF THE INVENTION

1. Field of the Invention

This invention relates to a flow controlling method and apparatus for use for transfer of a packet in a network between processors including a plurality of switches, and more particularly to a flow controlling method and apparatus for use for transfer of a packet between switches and between a processor and a switch connected to a network of switches.

2. Description of the Relates Art

A switch of the cross point buffer type which includes a number of FIFO (First In First Out) memories equal to the square of the "port number" on the input port side allows writing a packet into a FIFO memory at any time only if the FIFO memory is empty since, upon writing a packet into a FIFO memory, contention with writing from another port does not occur. However, as a number of FIFO memories equal to the square of the "port number" are required, it is inevitable from the limitation of the number of gates of a chip that the capacity of FIFO memories which can be mounted in a switch is small.

In a switch of the virtual cut-through type, a packet begins to be sent to the reception side only after reception side FIFO memories of a capacity sufficient to accept the entire one packet become empty. Therefore, a link between switches is occupied by a packet only for a time necessary to transfer the packet. Consequently, a switch of the virtual cut-through type is advantageous in that a high throughput of the entire network is achieved.

If it is intended to make a switch which employs a combination of the two types described above, the capacity of FIFO memories still matters. Since the number of required FIFO memories is as great as the square of the "port number", it is inevitable that the capacity of one FIFO memory is small. However, in order to implement the virtual cut-through, one FIFO memory is required to have a capacity sufficient to store at least one packet therein.

Meanwhile, since one packet is composed of a header part in which control information such as a destination of the packet is held and a part of data to be sent actually, as the length of one packet increases, the ratio of the packet header decreases, and this allows data to be sent with a higher degree of efficiency.

In summary, since the cross point buffer system is employed, the capacity of each FIFO memory becomes small, but since the virtual cut-through system is adopted, each FIFO memory must be able to store at least one packet therein, and when the efficiency in transfer of data with one packet is taken into consideration, the packet length must be as large as possible.

When the requirements described above are taken into consideration, it is required that the maximum length of one packet should be set to a size a little smaller than the capacity of one FIFO memory.

Since the virtual cut-through system is employed, it becomes possible to output a write-enable signal for reporting to a switch in the preceding stage that the FIFO memory is in a write-enabled state at a point of time when it becomes possible to receive one packet.

In a FIFO memory of a conventional system, an empty signal indicating that the FIFO memory has no data therein and no data can be read out from the FIFO memory and a full signal indicating that the FIFO memory is full of data and does not allow writing of any further data are used to perform flow control.

Further, taking the time required for flow control into consideration, some FIFO memories utilize an almost empty signal indicating a state wherein the FIFO memory will become empty if several more words are read out from it and/or an almost full signal indicating a state wherein the FIFO will become full if several more words are written into it. Each of the signals represents the respective condition with its level.

If it is tried to use FIFO memories of the conventional system for switches of the cross point buffer type and the virtual cut-through type, then since the maximum length of a packet is a little smaller than the capacity of the FIFO memories, in order to allow discrimination of whether writing into a FIFO memory in the next stage is possible, it is inevitable to use an empty or almost empty flag from the FIFO memory. This is because, in the virtual cut-through system, since, once writing of a packet is started, it is written into a FIFO memory to the finish, flow control cannot be performed with a full flag or an almost full flag which changes over to ON intermediately on writing.

Flow control where an empty flag is used proceeds in the following manner.

1. When the empty flag is ON, since the FIFO memory is in an empty state, a packet which is smaller than the capacity of the FIFO memory can be written into the FIFO memory to the finish, and consequently, it is discriminated that the FIFO memory allows writing and writing of the packet is started.
2. When the empty flag is OFF, although a packet may possibly be written into the FIFO memory to the end, depending upon the length of the packet, since the packet may not be written to the last end, writing of the packet is not started.

After one packet is written into a FIFO memory of the switch in the next stage, it becomes possible to write a next packet at a point of time when the preceding packet is read out fully from the FIFO memory and the empty flag changes over to ON. In short, unless the FIFO memory in the next stage is not read completely, writing of a next packet is not allowed.

In this manner, in a switch of the cross point buffer type and the virtual cut-through type, since the size of FIFO memories is proximate to the maximum size of one packet, for flow control for FIFO memories of the conventional type, flow control which employs an empty flag is used, and this results in a large overhead.

The first problem resides in that, since writing of a next packet is not permitted until a packet in a FIFO memory of the switch in the next stage is transferred and the FIFO memory of the switch in the next stage becomes empty, writing of a next packet in the switch in the preceding stage is made to wait.

One of the reasons is that whether or not the FIFO memory in the next stage allows writing can be reported only by an empty flag or an almost empty flag of the FIFO memory. Further, since the switch also employs the virtual cut-through system, even if the FIFO memory overflows, transfer of the packet cannot be stopped. Consequently, the other reason is that a full flag or an almost full flag of the FIFO memory cannot be used.

The second problem resides in that an empty flag and a full flag of the FIFO memory are not suitable for packet transfer of the virtual cut-through type which employs FIFO memories which have a capacity for only one packet.

The reason is that the empty flag and the full flag are originally used for flow control only with reference to the number of words in the FIFO memory and cannot be used for flow control in units of a packet.

Further, in the virtual cut-through system wherein the capacity of a FIFO memory corresponds to only one packet, once a packet in the FIFO memory begins to be processed, the packet will be read out entirely and the FIFO memory will become empty in the near future. However, the empty flag and the full flag are each a signal representing a state at present, and neither of them can transmit whether or not a packet is going to be processed. Also this is a reason for the second problem described above.

The third problem resides in that time is required for transmission of information that a FIFO memory does not allow writing.

The reason is that critical information is transmitted after a delay of time to the switch in the preceding stage because all flow control information is produced on the FIFO memory side into which writing is to be performed.

SUMMARY OF THE INVENTION

It is an object of the present invention to provide a flow control system by which, when transfer of the virtual cut-through type is performed with switches of the cross point buffer type, efficient transfer can be achieved even if the capacity of FIFO memories is small.

In order to achieve this, a flow control system which is suitable for packet transfer of the virtual cut-through type which employs FIFO memories having a capacity for only one packet must be provided to eliminate a delay when information representing that writing into the FIFO memories is not possible is transmitted.

The flow controlling method and apparatus of the present invention includes means (128, 137 of FIG. 2, 204 of FIG. 3) for transmitting, when a packet in a FIFO memory in a switch begins to be transmitted to another switch or a processor in the next stage, to the switch in the preceding stage with a write-enable signal pulse that the FIFO memory in the switch will become write-enabled. This means allows the write-enable state to be transmitted to the switch in the preceding stage before the FIFO memory becomes empty.

The flow controlling method and apparatus of the present invention further includes means (211, 212 of FIG. 3) provided on the writing side for storing a state of the FIFO memory in the next stage regarding whether writing into the FIFO memory is possible, and further includes means (202, 203 of FIG. 3) for rendering the FIFO memory into a write-disabled state at a point of time when a packet begins to be written into the FIFO memory in the next stage and rendering the FIFO memory into a write-enabled state when a write-enable signal into the FIFO memory arrives from the switch in the next stage.

Further, a reception FIFO memory in a processor includes means (304 of FIG. 4) for counting an empty word number in a FIFO memory, means (309 of FIG. 4) for counting a number of the words of a packet being written which are not written into the FIFO memory as yet, means (310, 311 of FIG. 4) for calculating a difference between the word numbers and comparing the calculated difference with a maximum packet length, and means (312 of FIG. 4) for outputting a write-enable signal to the switch in the preceding stage when a result of the comparison reveals that the difference is greater than the maximum packet length.

DETAILED DESCRIPTION OF THE PREFERRED EMBODIMENT

In the following, an embodiment of the present invention is described in detail with reference to the drawings.

Figure 1:
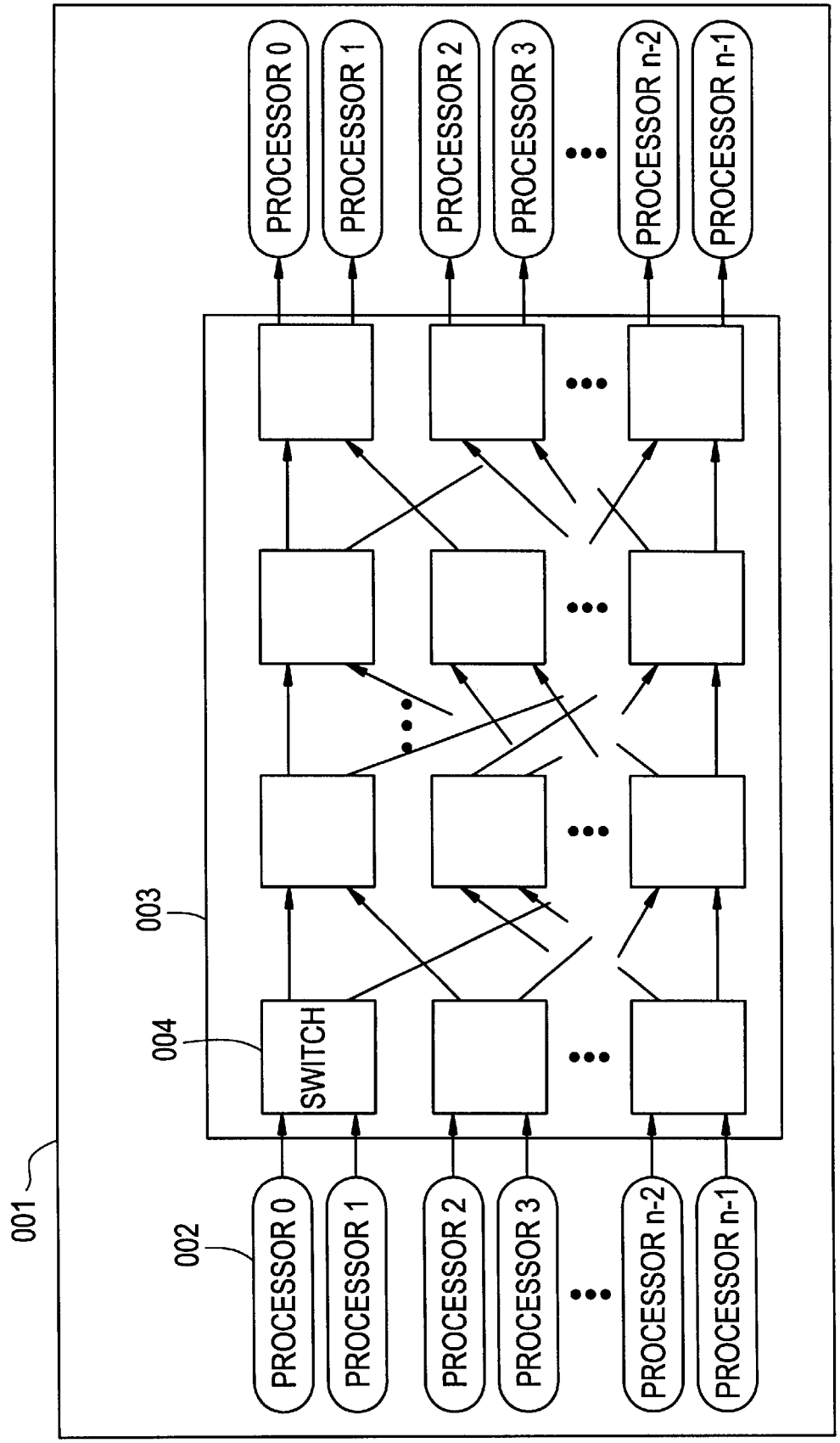
FIG. 1 is a diagrammatic view illustrating a construction of a parallel machine of an embodiment of the present invention.

FIG. 1 shows a construction of parallel machine 001 which uses a network which employs flow control of the present invention. In parallel machine 001, a plurality of processors 002 which individually perform operation are connected by network 003. Network 003 includes a plurality of switches 004, each of which has a 2-input and 2-output configuration and adopts the cross point buffer system and the virtual cut-through system.

Figure 2:
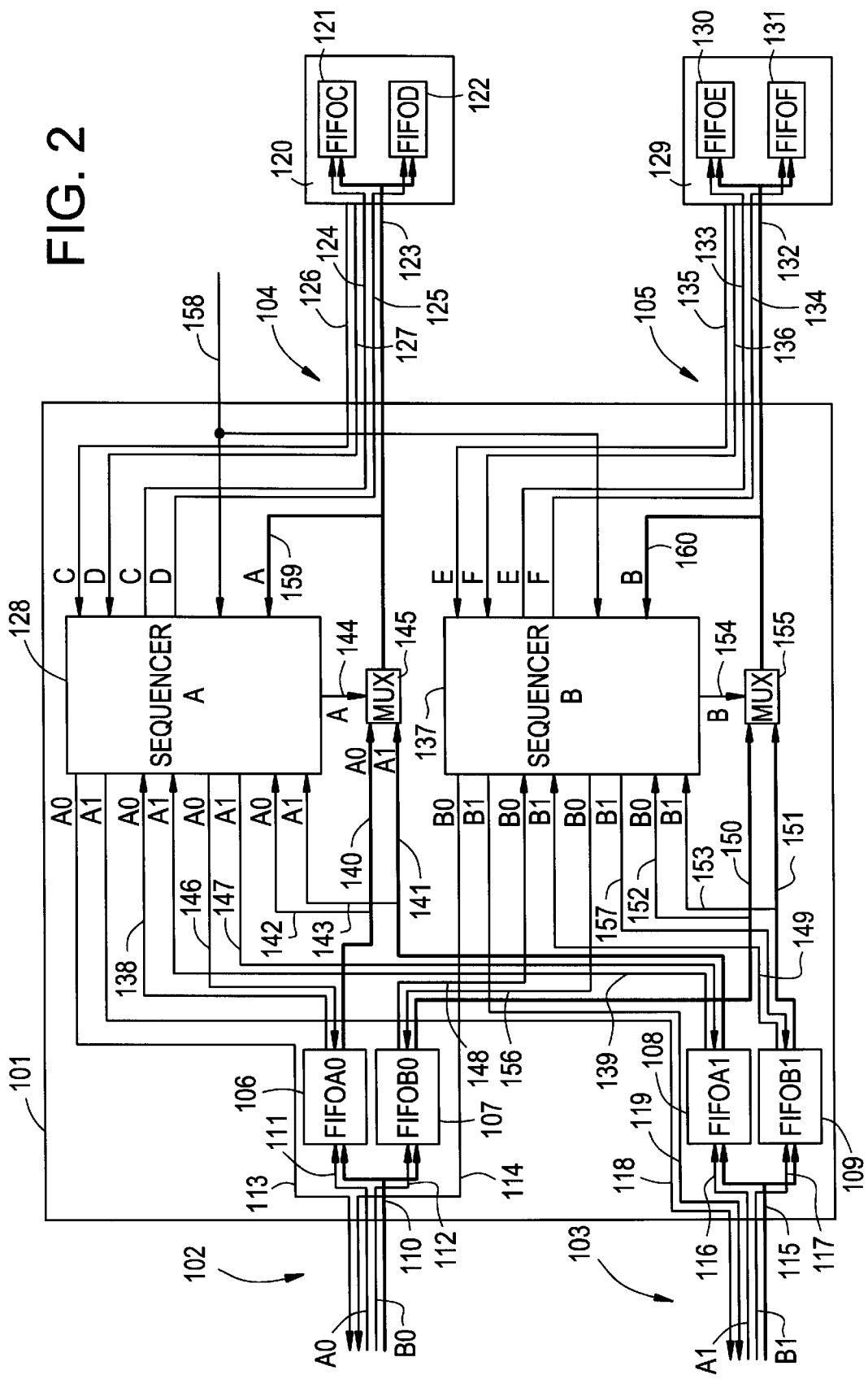
FIG. 2 is a block diagram illustrating a construction and operation of a switch of a network of the embodiment of the present invention.

FIG. 2 is a block diagram showing a construction of switch 101 of a first embodiment of the present invention.

Switch 101 has two input ports 102, 103, and two output ports 104, 105. Two FIFO memories of FIFO memory A0 106 and FIFO memory B0 107 are connected to input port 0 102. Two FIFO memories of FIFO memory A1 108 and FIFO memory B1 109 are connected to input ports 103. Since the switch is of the cross point buffer type, the total number of FIFO memories mounted in switch 101 is equal to the square of the number of ports, that is, 4.

While the capacity of the FIFO memories preferably is as large as possible, actually where the number of FIFO memories in the switch is large, the capacity per one FIFO memory is limited to a small one. Accordingly, also the FIFO memories in the present invention have a capacity a little larger than a maximum length of a packet. In the present invention, since control of the virtual cut-through system is performed, each of the FIFO memories is required to store one packet without fail, and actually, the maximum length of a packet is determined from the capacity of the FIFO memories.

To input port 0 102, write data 0 110, write signal A0 111 and write signal B0 112 are inputted from a switch in a preceding stage or a processor, and write data 0 110 and write signal A0 111 are inputted to FIFO memory A0 106 while write data 0 110 and write signal B0 112 are inputted to FIFO memory B0 107. To the switch in the preceding stage or the processor, write-enable signal A0 113 for reporting whether FIFO memory A0 106 is in a write-enabled state and write-enable signal B0 114 for reporting whether FIFO memory B0 107 is in a write-enabled state are outputted.

To input port 1 103, write data 1 115, write signal A1 116 and write signal B1 117 are inputted from another switch in the preceding stage or the processor, and write data 1 115 and write signal A1 116 are inputted to FIFO memory A1 108 while write data 1 115 and write signal B1 117 are inputted to FIFO memory B1 109. To the switch in the preceding stage or the processor, write-enable signal A1 118 for reporting whether FIFO memory A1 108 is in write-enabled state and write-enable signal B1 119 for reporting whether FIFO memory B1 109 is in a write-enabled enabled state are outputted.

From output port 0 104, write data CD 123 into FIFO memory C 121 and FIFO memory D 122, write signal C 124 into FIFO memory C 121 and write signal D 125 into FIFO memory D 122 are outputted to switch 120 in the next stage.

From switch 120 in the next stage, write-enable signal C 126 representative of whether FIFO memory C 121 is in a write-enabled state and write-enable signal D 127 representative of whether FIFO memory D 122 is in a write-enabled state are outputted, and they are inputted to sequencer A 128 in switch 101.

From output port 1 105, write data EF 132 into FIFO memory E 130 and FIFO memory F 131, write signal E 133 into FIFO memory E 130 and write signal F 134 into FIFO memory F 131 are outputted to switch 129 in the next stage. Further, from switch 129 in the next stage, write-enable signal E 135 representative of whether FIFO memory E 130 is in a write-enabled state and write-enable signal F 136 representative of whether FIFO memory F 131 is in a write-enabled state are outputted, and they are inputted to sequencer B 137 in switch 101.

To sequencer A 128, read-enable signal A0 138 representative of whether FIFO memory A0 106 has data to be read out therefrom, read-enable signal A1 139 representative of whether FIFO memory A1 108 has data to be read out therefrom, and route designation information A0 142 and route designation information A1 143 which are part of read data A0 140 and read data A1 141 which are data read out from the two FIFO memories, that is, FIFO memory A0 106 and FIFO memory A1 108, respectively, are inputted.

Further, to sequencer A 128, write-enable signal C 126 and write-enable signal D 127 from FIFO memories 121, 122 in the next stage are inputted. Sequencer A 128 10 determines, from the information from FIFO memories 121, 122, from within which one of FIFO memory A0 106 and FIFO memory A1 108 a packet should be processed next, selects read data A0 140 or read data A1 141 with packet selection signal A 144 by means of MUX 145, determines the selected data as write data CD 123 to switch 120 in the next stage, and controls read signal A0 146 and read signal A1 147 which are read signals to FIFO memory A0 106 and FIFO memory A1 108, respectively, and write signal C 124 and write signal D 125 which are write signals to FIFO memories 121, 122 in the next stage to write a packet into FIFO memory 121 or 122 of switch 120 in the next stage.

To sequencer B 137, read-enable signal B0 148 representative of whether FIFO memory B0 107 has data to be read out therefrom, read-enable signal B1 149 representative of whether FIFO memory B1 109 has data to be read out therefrom, and route designation information B0 152 and route designation information B1 153 which are part of read data B0 150 and read data B1 151 which are read data of the two FIFO memories of FIFO memory B0 107 and FIFO memory B1 109, respectively, are inputted.

Further, to sequencer B 137, write-enable signal E 135 and write-enable signal F 136 from FIFO memories 130, 131 in the next stage are inputted. Sequencer B 137 determines, from information of the signals, from within which one of FIFO memory B0 107 and FIFO memory B1 109 a packet should be processed next, selects read data B0 150 or read data B1 151 with packet selection signal B 154 by means of MUX 155, determines the selected read data as write data EF 132 to switch 129 in the next stage, and controls read signal B0 156 and read signal B1 157, which are read signals to FIFO memory B0 107 and FIFO memory B1 109, respectively, and write signal E 133 and write signal F 134, which are write signals to FIFO memories 130, 131 in the next stage, to write a packet into FIFO memory 130 or 131 of switch 129 in the next stage.

Further, to each switch 101, stage number information 158 representing at what-numbered stage the switch is positioned is inputted. Based on stage number information 158, each of sequencers 128, 137 selects one bit of each of route designation information 142, 143, 152 and 153 to which the switch must pay attention. Further, to each of those switches which discriminate from stage number information 158 that they are positioned in the last stage, a processor is connected in the next stage. When the next stage to a switch is a processor, since the reception FIFO memory of the processor includes only one FIFO memory, the switch uses only a write signal and a write-enable signal on one side determined in advance.

Figure 3:
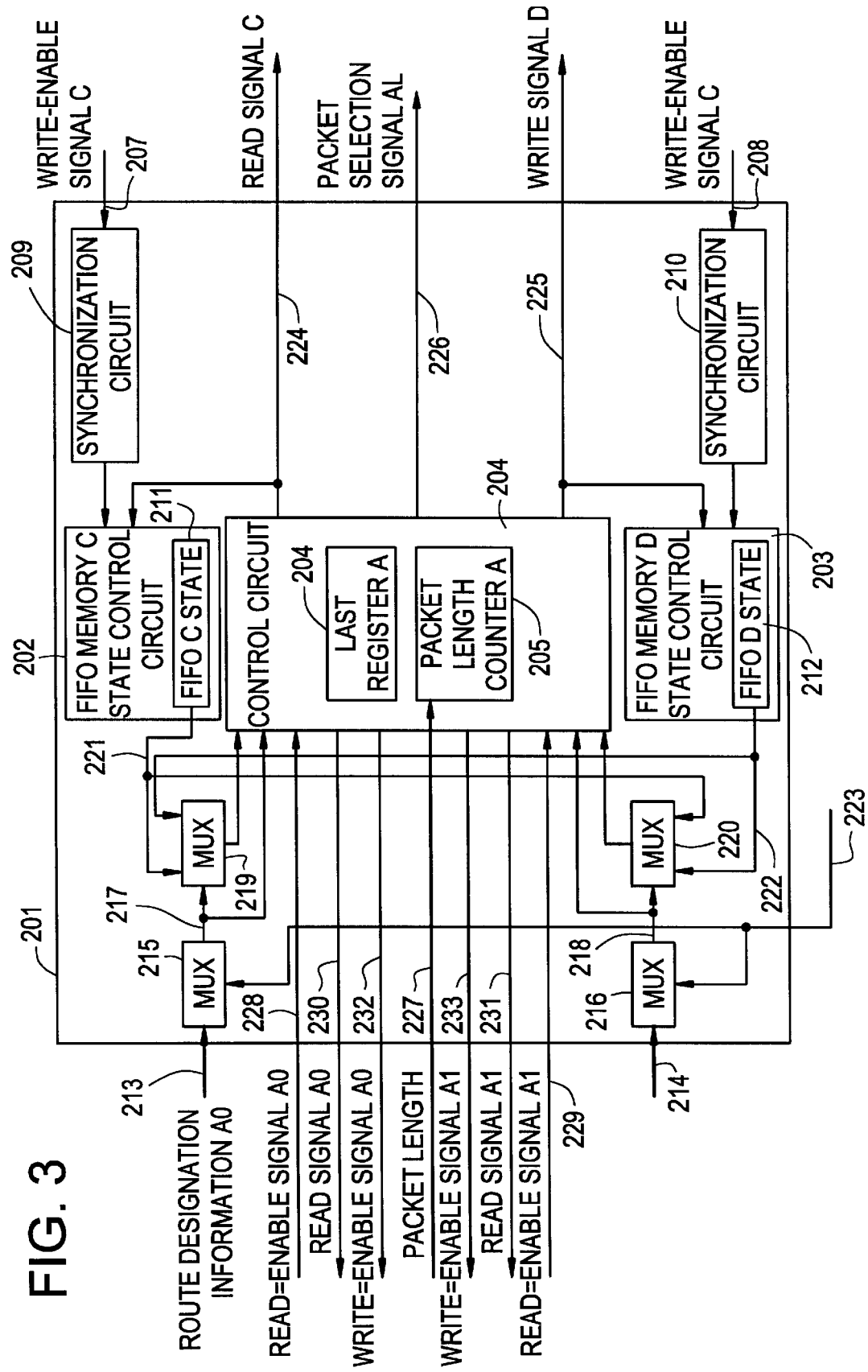
FIG. 3 is a block diagram illustrating a construction and operation of a sequencer in a switch of the embodiment of the present invention.

FIG. 3 shows a detailed block diagram of sequencer A 128. Also sequencer B 137 has a similar construction.

Sequencer A 201 includes FIFO memory C state control circuit 202, FIFO memory D state control circuit 203, and control circuit 204. Control circuit 204 includes packet length counter A 205 for storing length 227 of a packet and counting the number of transmitted words. In order to determine from which one of FIFO memory A0 and FIFO memory A1 a packet should be processed, control circuit 204 includes last register A 206 for storing from which one of the FIFO memories a packet has been processed last.

Write-enable signals 207, 208 from the next stage are synchronized by synchronization circuits 209, 210 and inputted to FIFO memory state control circuits 202, 203, respectively. FIFO memory state control circuits 202, 203 include FIFO memory state registers 211, 212 which represent whether the FIFO memories in the next stage are in a write-enabled state, respectively.

Each of synchronization circuits 209, 210 here includes a series connection of two FFs having a propagation time sufficiently short with respect to a clock frequency and restores, even if the flip-flop in the first stage thereof receives a signal which is not in synchronism with the clock of the FFs and is put into a metastable state, a stable state before it receives a next clock, thereby assuring that 1 or 0 is inputted to the flip-flop in the second stage without fail. Generally, even if data of 1 bit which exhibits an equal value for two or more clocks is passed through this synchronization circuit, it can convey a variation in value thereof although the variation timing may be displaced.

From route designation information 213, 214, one bit which relates to this switch is selected by MUX 215, 216, respectively, based on stage number information 223. One bit 217, 218 is used to select one of state signals 221, 222 of the two FIFO memories from two FIFO memory state control circuits 202, 203 by MUX 219, 220, and the selected state signal is inputted to control circuit 204.

Figure 4:
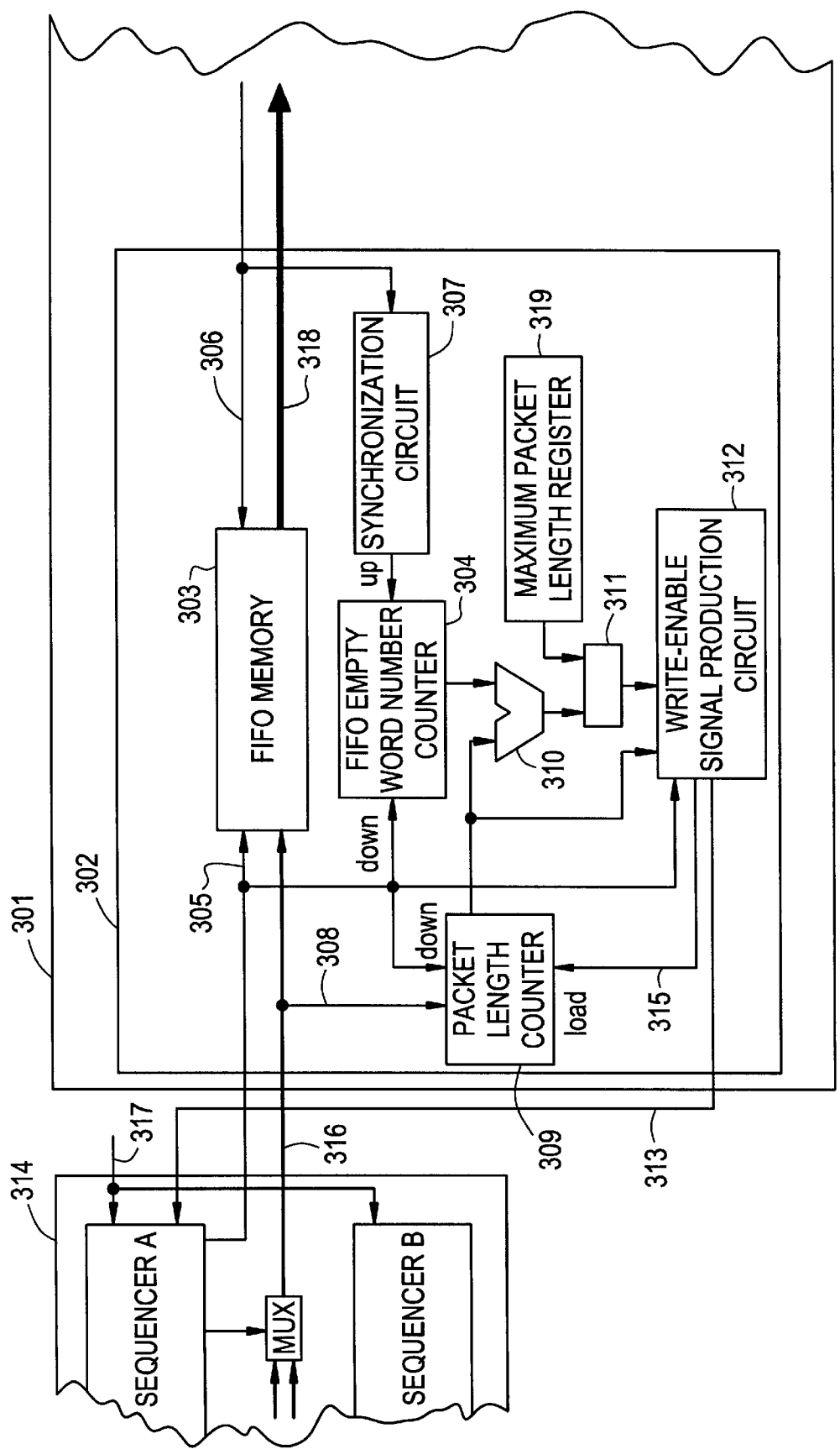
FIG. 4 is a block diagram illustrating a construction and operation of a reception FIFO memory in a processor of the embodiment of the present invention.

FIG. 4 is a block diagram showing a construction of reception FIFO memory 302 in processor 301 in the first embodiment of the present invention.

Reception FIFO memory 302 includes FIFO memory 303 having a capacity sufficient to accept several packets. Even if the capacity of FIFO memory 303 is large, since the virtual cut-through system is employed, the limitation still exists in that, once it begins to receive a packet, it must receive the packet to the end. Therefore, flow control of reception FIFO memory 302 of processor 301 is performed by producing write-enable signal 313 based on determination of whether or not a next packet can be written into FIFO memory 303 by comparison between the empty area of FIFO memory 303 and the maximum length of a packet.

Reception FIFO memory 302 of processor 301 includes counter 304 which counts the number of empty words in FIFO memory 303. Counter 304 is decremented by one or incremented by two in response to write signal 305 into FIFO memory 303 or read signal 306 from FIFO memory 303.

Write signal 305 into FIFO memory 303 is in synchronism with a clock of switch 314 in the preceding stage, and read signal 306 from FIFO memory 303 is in synchronism with a clock of processor 301. Accordingly, read signal 306 from FIFO memory 303 is synchronized with the clock of switch 314 in the preceding stage by synchronization circuit 307 and is used for an incrementing signal for counter 304. Reception FIFO memory 302 of processor 301 further includes packet length counter 309 which stores packet length 308 written in the packet header and decrements in response to write signal 305 into FIFO memory 303 to detect the end of the packet.

Reception FIFO memory 302 of processor 301 further includes subtractor 310 for subtracting the value of packet length counter 309 from the value of FIFO memory empty word number counter 304. A result of the subtraction and maximum packet length register 319 in which the maximum packet length is stored are compared with each other by comparator 311, and write-enable signal 313 is produced based on a result of the comparison by write-enable signal production circuit 312 and outputted to switch 314 in the preceding stage.

Write-enable signal production circuit 312 uses the value of packet length counter 309 and write signal 305 to produce control signals such as load 315 of the packet length into packet length counter 309.

Figure 7:
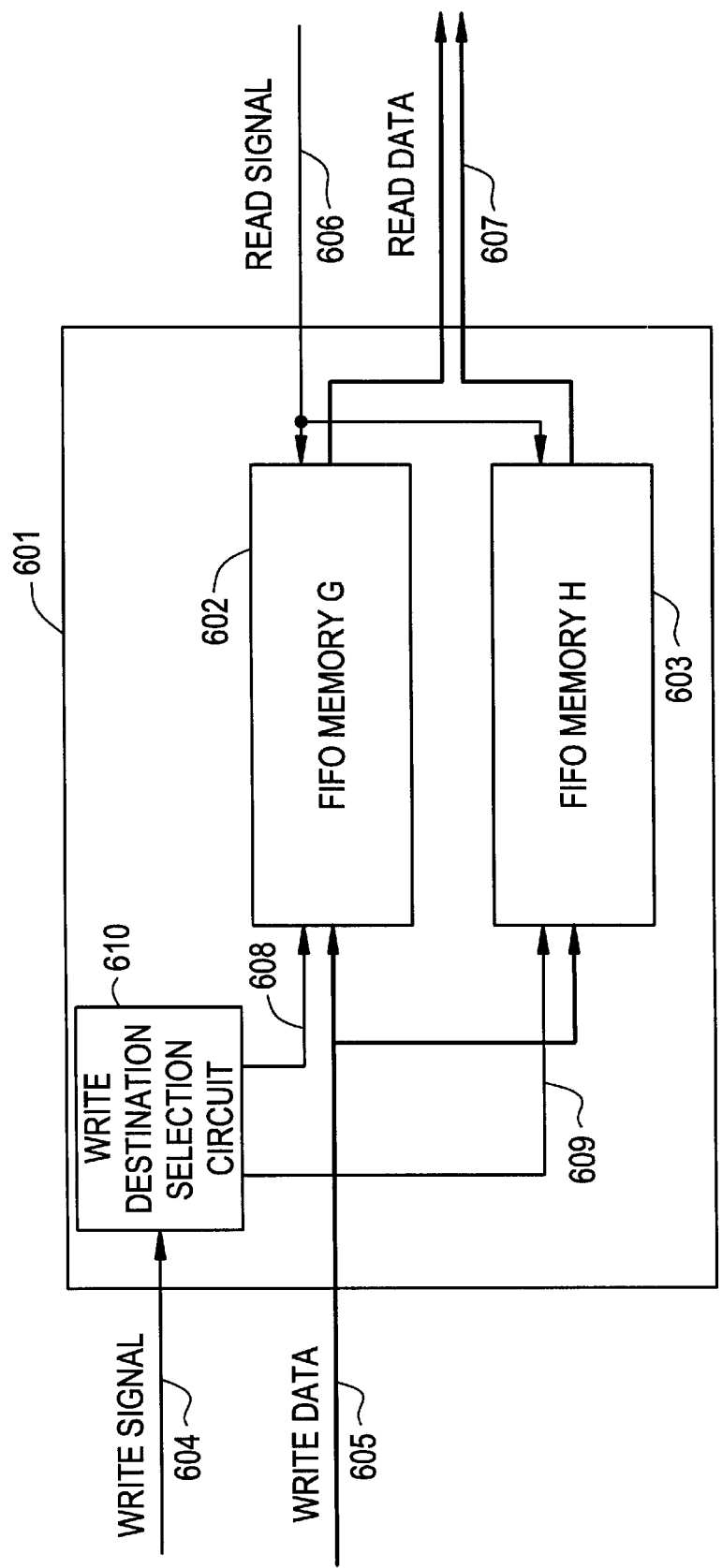
FIG. 7 is a block diagram illustrating a construction of FIFO memories in the reception FIFO memory of the embodiment of the present invention.

FIG. 7 illustrates a construction of FIFO memory 303. FIFO memory 601 includes two FIFO memory G 602 and FIFO memory H 603. Write destination selection circuit 610 selects one of the FIFO memories into which a packet is to be written and divides write signal 604 alternately into write signals 608, 609 for FIFO memory G 602 and FIFO memory H 603 so that write data 605 is alternately written into FIFO memory G 602 and FIFO memory H 603 for each one word, respectively. Read data 607 has a data width equal to twice that of write data 605 and is composed of data read out simultaneously from FIFO memory G 602 and FIFO memory H 603 in response to a read signal and coupled to each other.

Now, processing of a switch is described with reference to FIGS. 2 and 3.

When the switch is in a reset state, the FIFO memories are in an empty state, and consequently, the read-enable signals of all of the FIFO memories exhibit 0. Further, since all of the FIFO memories are in a write-enabled state, FIFO register state registers 211, 212 in FIFO memory state control circuits 202, 203 in the sequencers exhibit 1 and indicate a write-enabled state. Last register 206 has an initial value determined in advance.

First, it is assumed that a first packet begins to be written into FIFO memory A0 106. Read-enable signal A0 138, 228 of FIFO memory A0 106 exhibits 1, and a packet header is outputted to read data A0 140 of FIFO memory A0 106, and route designation information A0 142, 213 is inputted to sequencer A 128, 201.

Sequencer A 128, 201 selects, based on stage number information 158, 223 of the route designation information, one bit 217 to which attention must be paid by the switch in this stage, and selects, based on route selection bit 217, state signal 221, 222 of a FIFO memory to be written in the next stage. Here, if route selection bit 217 is 0, then FIFO memory C state signal 221 is selected, but if route selection bit 217 is 1, then FIFO memory D state signal 222 is selected, and the selected signal is inputted to control circuit 204. Now, it is assumed that route selection bit 217 is 0.

In control circuit 204, since FIFO memory read-enable signal A0 228 is 1 and FIFO memory C state signal 221 selected by MUX 219 is 1 which represents a write-enabled state, processing of writing a packet in FIFO memory A0 106 into FIFO memory C 121 in the next stage is started. The processing proceeds in the following manner.

First, packet selection signal A 114, 226 is set to 0 to select read data A0 140 by MUX 145, and read data A0 140 is determined as write data CD 123. Further, packet length A 159, 227 is loaded into last register A 206, and last register 206 is set to 0 representing that FIFO memory A0 106 has been processed.

Then, read signal A0 146, 230 and write signal C 124, 224 are set to 1 so that the packet in FIFO memory A0 106 is transferred to FIFO memory C 121 in the next stage. In this instance, each time one word is transferred, packet length counter A 205 is decremented by one, and the transfer is continued until the count value of last register A 206 becomes equal to zero.

While the transfer processing of data proceeds in such a manner as described above, the following processing is performed parallelly upon starting of the data transfer.

First, in response to changing over of write signal C 124, 224 to 1, FIFO memory C state control circuit 202 sets FIFO memory C state register 211 to 0 to render the state of FIFO memory C 121 into a write-disabled state.

Further, when the transfer of data is started, control circuit 204 outputs write-enable signal A0 113, 232 to a switch or a processor in the preceding stage.

In the present system, for all write-enable signals between a processor and a switch, between a switch and a switch and between a switch and a processor, not the level but a pulse is used. Since the processors and the switches operate with different clocks from each other, the pulse width is set equal to a magnitude of two clocks such that, even if a write-enable signal is passed through a synchronization circuit, a pulse for one clock may remain without fail to transmit a write-enabled state.

The reason why a pulse of a write-enable signal is issued upon starting of transfer is that the operation frequencies of all of the processors and switches are equal and the transfer rates are equal. Since the transfer rates are equal, once a packet in a FIFO memory begins to be transferred to a FIFO memory in the next stage, even if a next packet begins to be written into the FIFO memory from a FIFO memory in the preceding stage, because the virtual cut-through system is employed, the packet continues to be read out at a fixed rate from the FIFO memory. Further, since the next packet continues to be written at the equal rate, the FIFO memory does not overflow even if care is not taken of the number of remaining words in the FIFO memory.

Further, even if the operation frequencies have a difference, if the difference between the capacity of the FIFO memories and the maximum packet length corresponds to the difference between the operation frequencies, then the FIFO memory does not overflow even if a write-enable signal is outputted at a point of time when processing of a packet is started in a similar manner.

Next, processing of FIFO memory C state control circuit 202 when write-enable signal C 126, 207 is received from FIFO memory C 121 in the next stage is described.

A pulse for 2 clocks of write-enable signal C 126, 207 arrives from switch 120 in the next stage. As the pulse passes through synchronization circuit 209, it becomes a pulse for one clock or a pulse for two clocks, and this is inputted to FIFO memory C state control circuit 202. When the pulse is inputted to FIFO memory C state control circuit 202, FIFO memory C state register 211 changes over from 0 to 1 so that it indicates that FIFO memory C 121 is in a write-enabled state.

Figure 5:
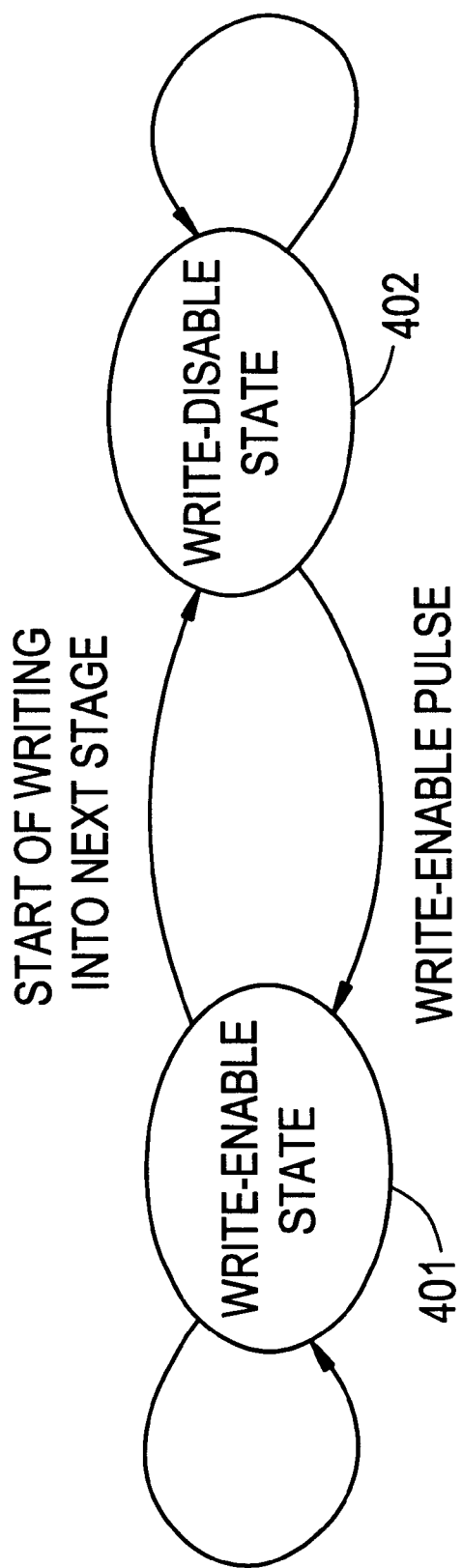
FIG. 5 is a diagrammatic view illustrating a state transition of a FIFO memory state controlling circuit in the sequencer in a switch of the embodiment of the present invention.

FIG. 5 is a diagram illustrating a state transition of FIFO memory state control circuits 202, 203. The initial value of FIFO memory state control circuits 202, 203 exhibits write-enabled state 401, but changes to write-disabled state 402 in response to a write signal. If a pulse of a write-enable signal arrives while FIFO memory state control circuits 202, 203 are in write-disabled state 402, then they return to write-enabled state 401.

The writing condition of a FIFO memory in the next stage is made different between the writing side and the written side in this manner. This prevents, when the FIFO memory in the next stage is in a write-disabled state, erroneous writing into the same which arises from the fact that time is required until the write-disabled state is transmitted from the FIFO memory in the next stage.

Further, while a write-enable signal is delayed as it passes through a synchronization circuit, since it is outputted at a point of time when a packet begins to be processed as described above, a little delay can be ignored.

Last register 206 is provided to store a packet of the one of the FIFO memories where has been processed last. The one of the FIFO memories which is designated by last register 206 is lower in priority degree than the other FIFO memory. When the two FIFO memories are both in a read-enabled state and also the FIFO memory of the destination is in a write-enabled state and consequently a packet can be transferred, the control circuit determines based on the priority order provided by last register 206 a packet of the one of the FIFO memories which should be processed.

Next, processing by reception FIFO memory 302 of processor 301 is described with reference to FIGS. 3 and to 4.

In switch 314 in the last stage, route designation bit 217, 218 selected by MUX 215, 216 with stage number information 223, 317 exhibits the value 0 irrespective of route designation information 213, 214 from read data. Accordingly, FIFO memory C state signal 221 is selected without fail by next MUXs 219, 220. Accordingly, also for the write signal as a result of the selection of FIFO memory C state signal 221, only write signal C 224, 305 is used.

Although a FIFO memory of a switch can transfer a packet at a fixed rate to the end once it starts transfer of the packet, the reading rate from reception FIFO memory 302 of processor 301 is not necessarily fined. This is because, since data 318 read out from reception FIFO memory 302 is written into a memory and the memory is accessed also from another unit such as a CPU, the reading time of a packet from reception FIFO memory 302 cannot be estimated. Accordingly, reception FIFO memory 302 of processor 301 requires flow control different from that of a FIFO memory in a switch.

As described hereinabove, FIFO memory 303 of reception FIFO memory 302 in processor 301 has a capacity sufficient to store several packets. When the FIFO memory 303 is in a reset state, it is empty, and FIFO memory state register 211 of switch 314 in the preceding stage exhibits 1 and indicates a write-enabled state.

After a packet is written into a FIFO memory of switch 314 in the preceding stage, since the state of FIFO memory 303 of reception FIFO memory 302 of processor 301 is a reception permitting state, writing of a packet into reception FIFO memory 302 of processor 301 from switch 314 in the last stage is started.

First, packet length 308 in the packet header at the top of the packet is loaded into packet length counter 309 in reception FIFO memory 302. Since the value of packet length counter 309 is decremented in response to write signal 305, packet length counter holds the number of words of the packet will be written into FIFO memory 303. Then, the value of packet length counter 309 is subtracted from the value of FIFO memory empty word number counter 304 by subtractor 310, and a resulting value is compared with the maximum packet length set in maximum packet length register 319 by comparator 311. A result of the comparison is inputted to write-enable signal production circuit 312. If the result of comparison is (the number of empty words−number of words will be written) ≧ maximum packet length, then write-enable signal 313 of a two-clock width indicating a write-enabled state is outputted to switch 314 in the preceding stage.

Figure 6:
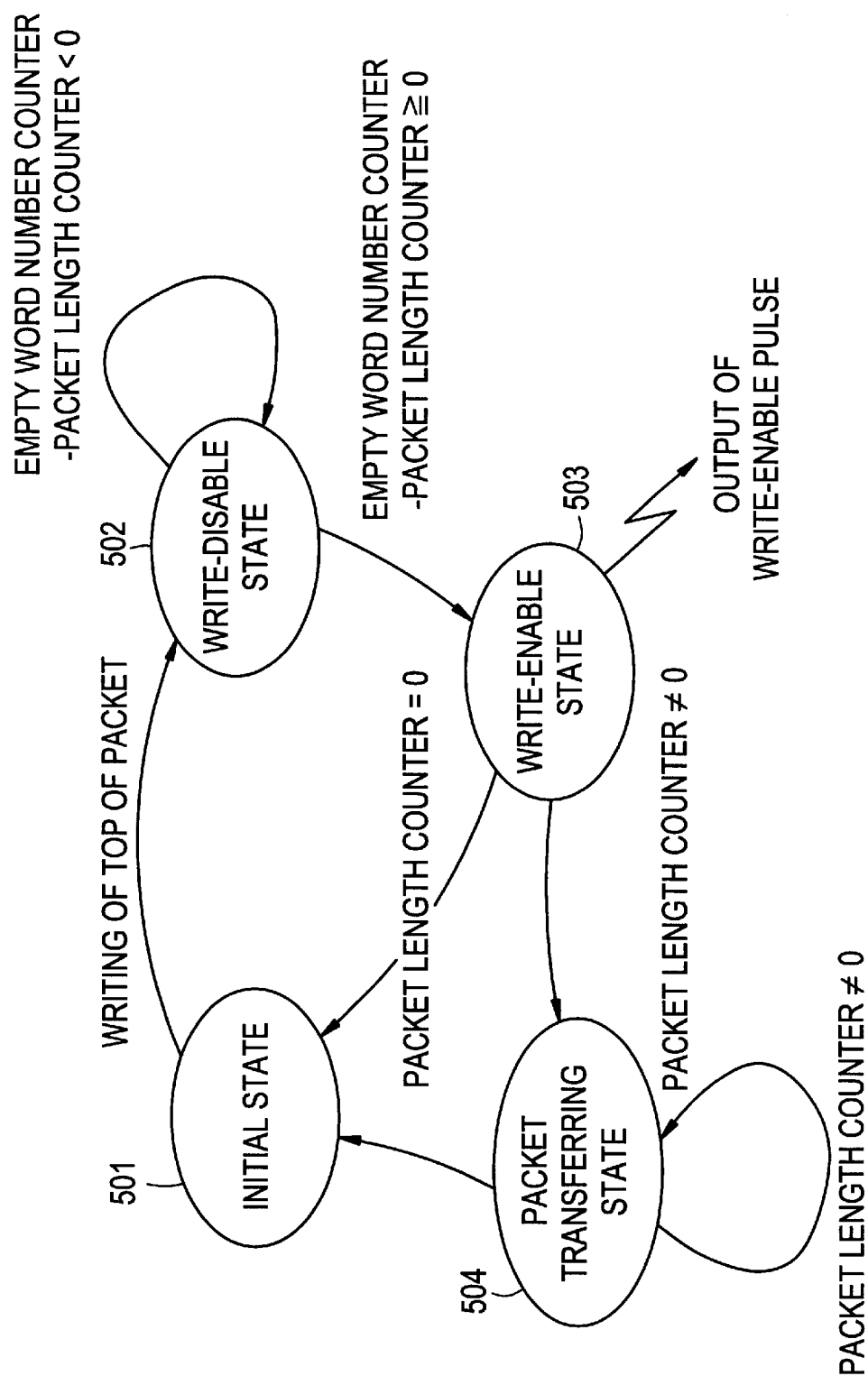
FIG. 6 is a diagrammatic view illustrating a state transition of a write-enable signal production circuit in the reception FIFO memory of the embodiment of the present invention.

FIG. 6 shows a diagrammatic view illustrating a state transition of write-enable signal production circuit 312. If writing into a reception FIFO memory occurs in initial state 501, then write-enable signal production circuit 312 enters write-disabled state 502 and supervises a result of comparison between a value obtained by subtracting the value of packet length counter 309 from empty word number counter 304 and the maximum packet length.

If a result of the comparison is (the number of empty words−number of words will be written) ≧ maximum packet length, then write-enable signal production circuit 312 enters write-enabled state 503 and outputs write-enable signal 313. In write-enabled state 503, if the transfer of the packet is completed and the packet length counter is equal to 0, then write-enable signal production circuit 312 enters initial state 501, but if the transfer of the packet is not completed and packet length counter 309 is not equal to 0, then write-enable signal production circuit 312 enters packet transferring state 504. In packet transferring state 504, when the transfer of the packet is completed and packet length counter 309 becomes equal to zero, write-enable signal production circuit 312 returns to initial state 501.

As shown in FIG. 7, since read data 607 has a width equal to twice that of write data 605, FIFO memory empty word number counter 304 is incremented by two when reading out is performed once. Since read data 318 read out from FIFO memory 303 is written into a memory, the time at which reading out is to be started depends upon whether there is an access to the memory from some other module such as a CPU in processor 301 and accordingly is different among different cases.

However, once reading out is started, since data is read out from FIFO memory 303 at a rate equal to twice the writing rate, although the condition of (the number of empty words−number of words will be written) < maximum packet length is exhibited when the writing of the packet is started, the condition of (the number of empty words−number of words will be written) ≧ maximum packet number may possibly be reached because reading out is started intermediately of the writing.

Further, since the capacity on FIFO memory 303 of reception FIFO memory 302 is set to a level sufficient to allow reception of several packets, even if reading out from FIFO memory 303 is not performed periodically, a plurality of words may be read out successively by one reading out operation, and further, if the rate then is as high as twice, then the steady writing rate into FIFO memory 303 and the non-periodical reading out rate may possibly become substantially equal to each other. Consequently, it is estimated that such a situation occurs frequently that, upon starting of writing of a packet, the comparison result indicates (the number of empty words−number of words will be written) ≧ maximum packet length and write-enable signal 313 is sent to the switch in the preceding stage.

From the reasons described above, flow control different from that for switch 101 is performed for reception FIFO memory 302 of processor 301. However, similarly as in the case of switch 101, it can be expected that reception FIFO memory 302 transmits write-enable signal 313 to the preceding stage when a packet begins to be written.

The flow controlling method and apparatus of the present invention is advantageous in that, although a switch of the cross point buffer type and the virtual cut-through type is employed, a write-enable signal for a next packet can be outputted before a FIFO memory becomes empty, and the condition wherein the FIFO memory must wait until a FIFO memory in the next stage becomes write-enabled can be decreased and efficient transfer of packets can be achieved.

Further, the flow controlling method and apparatus of the present invention provides a condition like a wormhole wherein two packets are present in one FIFO memory, and this raises the efficiency in use of the FIFO memory. This provides an advantage that not only the throughput of the entire network of the virtual cut-through system is improved, but also the transfer time of each individual packet is shortened.

What is claimed is:

1. A packet switch, comprising:
    data inputs and data outputs;
    for each of said data inputs, a set of respective FIFO memories, said packet switch having a total number of said FIFO memories equal to a square of a number of said data inputs, each FIFO memory of said set of respective FIFO memories being large enough to hold an entire data packet; and
    means for transmitting a state signal for a given one of said FIFO memories to another device; wherein:
        said packet switch is adapted to operate so that, once a transmission of one of said data packets from one of said respective FIFO memories to one of said data outputs is started, said one of said data packets is transmitted without stopping until said one of said data packets is completely emptied out of said one of said respective FIFO memories;
        said means for transmitting changes said state signal from a write disable state to a write enable state at the beginning of a transmission of a data packet from said given one of said FIFO memories to one of said data outputs; said change to said write enable state indicating to a preceding packet switch that said given one of said FIFO memories is enabled for writing; and
        said means for transmitting outputs said state signal before said one of said data packets is completely emptied out of said said given one of said FIFO memories.

2. The packet switch as set forth in claim 1, further comprising:
    a next stage state control circuit storing a next stage state value corresponding to a state of each FIFO memory in a next stage packet switch;
    said next stage control circuit changing said next stage state value from a write enable state to a write disable state at the beginning of a transmission of a data packet to said next stage packet switch; and
    said next stage state control circuit changes said next stage state value from said write disable state to said write enable state at the arrival of a write enable signal from said next stage packet switch.

3. A receiving circuit of a processor connected to a network, comprising:
    a FIFO memory storing data packets from said network,
    a counter counting the number of empty words in each said FIFO memory, based on a write signal and a read signal for said FIFO memory,
    other counter counting the number of words, not yet written into said FIFO memory, of a packet being received,
    a register storing a value corresponding to the maximum length of a packet,
    a subtractor calculating a difference between the values of the two counters, and
    a comparator comparing the difference with the value of the register,
    wherein said receiving circuit outputs a state signal for a preceding stage switch when a result of the comparison reveals that the difference between the two counters is greater than the maximum length of the packet.

4. A flow control method for a packet switch having data inputs and data outputs; for each of said data inputs, a set of respective FIFO memories, said packet switch having a total number of said FIFO memories equal to a square of a number of said data inputs, each FIFO memory of said set of respective FIFO memories being large enough to hold an entire data packet; and means for transmitting a state signal for a given one of said FIFO memories to another device; said method comprising:
    once a transmission of one of said data packets from one of said respective FIFO memories to one of said data outputs is started, said one of said data packets is transmitted without stopping until said one of said data packets is completely emptied out of said one of said respective FIFO memories; and
    outputting said state signal, representing said one of said respective FIFO memories becoming write enabled, to the preceding switch at the beginning of a transmission of a data packet from said one of said respective FIFO memories to one of said data outputs.

5. The flow control method as set forth in claim 4, further comprising:

storing a next stage state value corresponding to a state of each FIFO memory in the next stage;

changing said next stage state value from a write enable state to a write disable state at the beginning of a transmission of the data packet to the FIFO memory and the next stage; and changing said next stage state value from the write disable state to the write enable state upon the arrival of a write enable signal from a next stage device.

6. A flow control method for a receiving circuit of a processor connected to and network, comprising:

providing a FIFO memory for storing data packets from the network, counting, as a first value, the number of empty words in each said FIFO memory, based on a write signal and a read signal for said FIFO memory, counting, as a second value, the number of words, not yet written into said FIFO memory, of a packet being received, storing a value corresponding to the maximum length of a packet, calculating a difference between the first value and the second value, comparing the difference with the value of the register, and outputting a state signal for a preceding stage switch when a result of the comparison reveals that the difference between the first value and the second value is greater than the maximum length of the packet.

* * * * *